(12) United States Patent
Willes et al.

(10) Patent No.: US 10,610,342 B2
(45) Date of Patent: Apr. 7, 2020

(54) HOLDER/DISPENSER FOR MULTIPLE STACKS OF IDENTICALLY-COLORED ZIRCONIA INGOTS

(71) Applicants: Mark Aaron Willes, Pleasant Grove, UT (US); Jeffrey Iver Barney, Pleasant Grove, UT (US)

(72) Inventors: Mark Aaron Willes, Pleasant Grove, UT (US); Jeffrey Iver Barney, Pleasant Grove, UT (US)

( * ) Notice: Subject to any disclaimer, the term of this patent is extended or adjusted under 35 U.S.C. 154(b) by 0 days.

(21) Appl. No.: 16/262,901

(22) Filed: Jan. 30, 2019

(65) Prior Publication Data
US 2019/0239995 A1 Aug. 8, 2019

Related U.S. Application Data

(60) Provisional application No. 62/626,273, filed on Feb. 5, 2018.

(51) Int. Cl.
*A61C 19/02* (2006.01)
*A61C 13/08* (2006.01)
*A61C 13/00* (2006.01)

(52) U.S. Cl.
CPC .......... *A61C 19/02* (2013.01); *A61C 13/0022* (2013.01); *A61C 13/082* (2013.01)

(58) Field of Classification Search
CPC ......... A47F 1/126; A47F 3/002; G07G 3/003; G07F 11/42; G07F 9/026; A61C 13/082; A61C 19/02; A61C 13/0022
USPC ....................................................... 211/59.3
See application file for complete search history.

(56) References Cited

U.S. PATENT DOCUMENTS

| | | | | |
|---|---|---|---|---|
| 3,313,448 A | * | 4/1967 | Suttle | A47F 1/08 221/3 |
| 3,858,757 A | * | 1/1975 | Langdon, Jr. | A47F 1/08 221/92 |
| 5,700,075 A | * | 12/1997 | Perone | A47F 1/08 221/131 |
| 2011/0024443 A1 | * | 2/2011 | Casati | A47F 1/08 221/92 |
| 2016/0375201 A1 | * | 12/2016 | Knaub | A61M 5/44 221/131 |

* cited by examiner

*Primary Examiner* — Gene O Crawford
*Assistant Examiner* — Ayodeji T Ojofeitimi
(74) *Attorney, Agent, or Firm* — Angus C. Fox, III

(57) ABSTRACT

The present invention provides a wall-mountable holder/dispenser for at least ten different shades of puck-shaped ingots from which dental crowns are fabricated. The holder/dispenser is formed from two snap-together pieces: an anterior portion and a posterior portion. Ten cylindrical columns are formed when the anterior and posterior portions are snapped together, with each portion forming one-half of each column. The posterior portion also includes a bottom extension for each column. Each extension underlies a column and provides a front opening through which an individual ingot can be extracted from the column with the fingers. Each extension has an upward protruding bump at the anterior end thereof which acts as a stop to prevent ingots from slipping out of the opening. Each column of the holder/dispenser is designed to hold a stack of identically colored zirconia ingots.

20 Claims, 11 Drawing Sheets

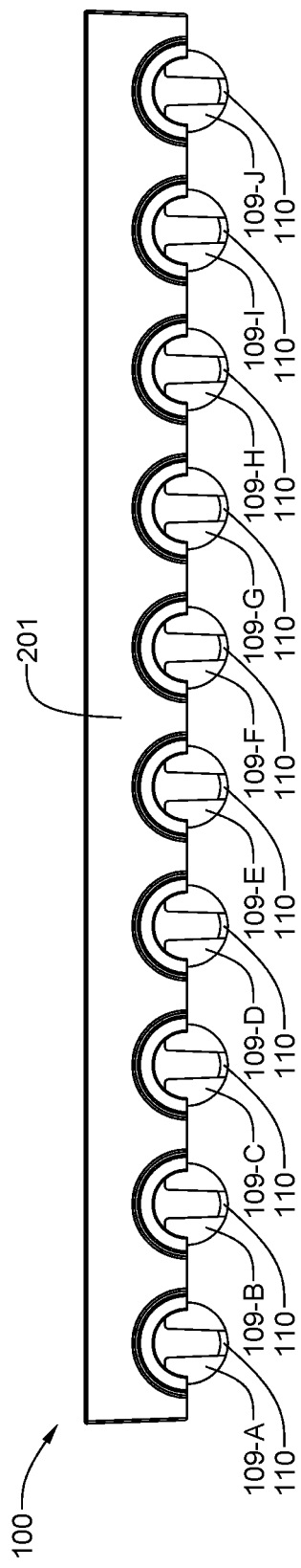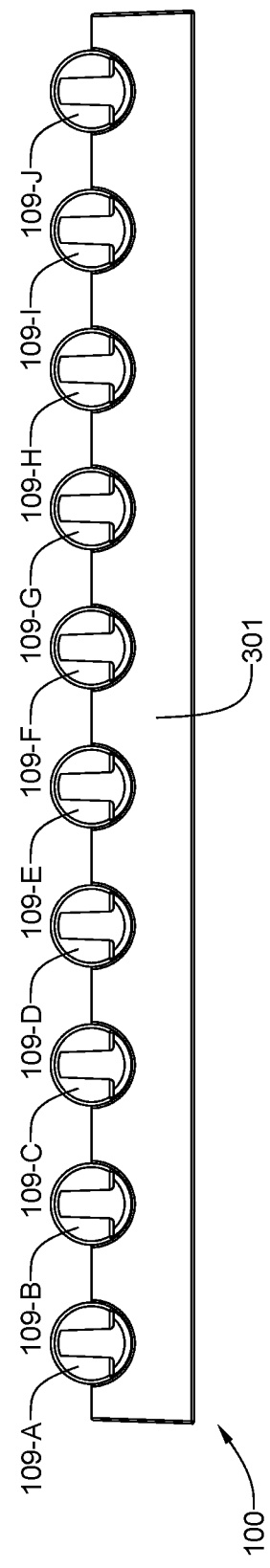

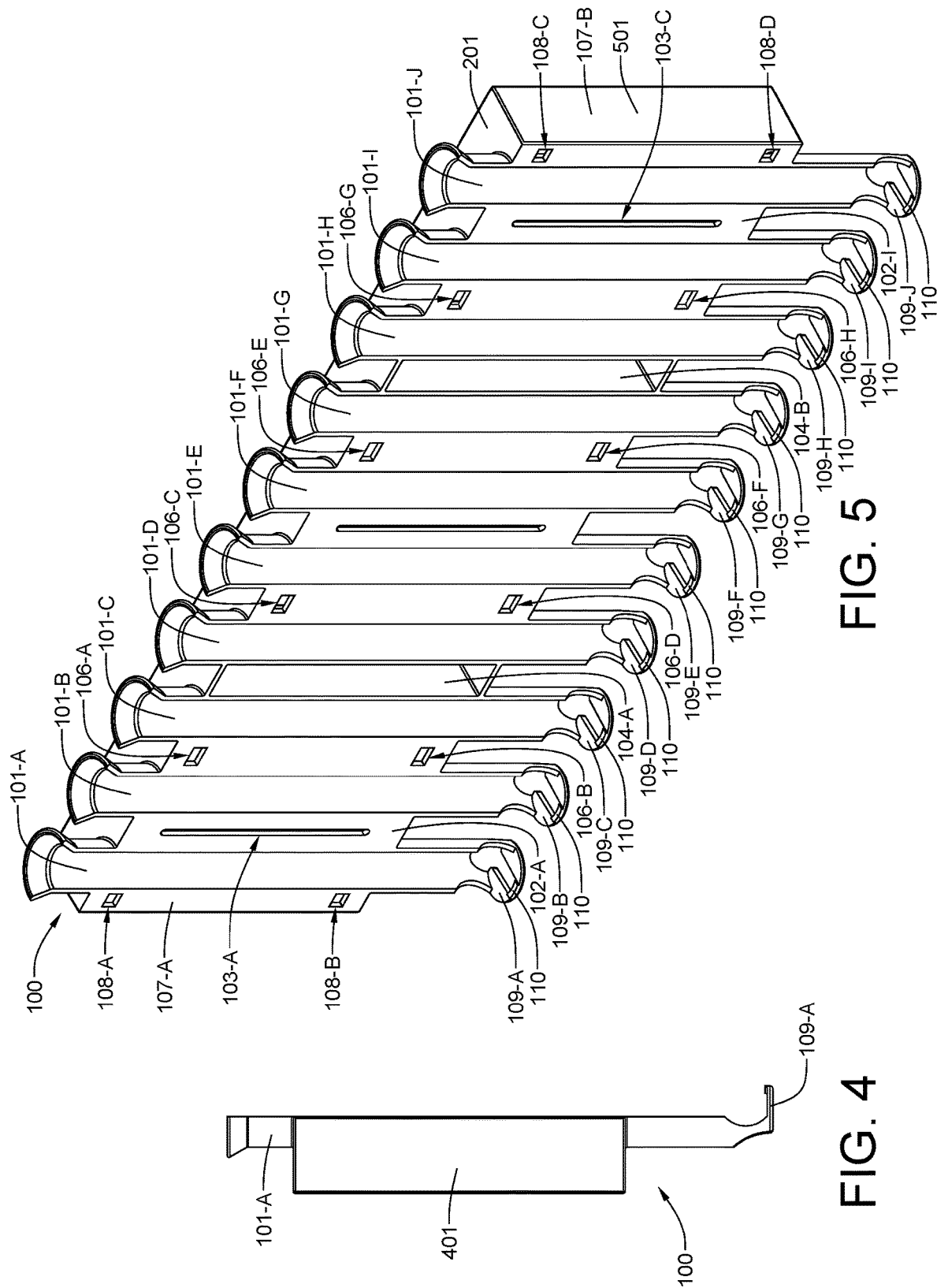

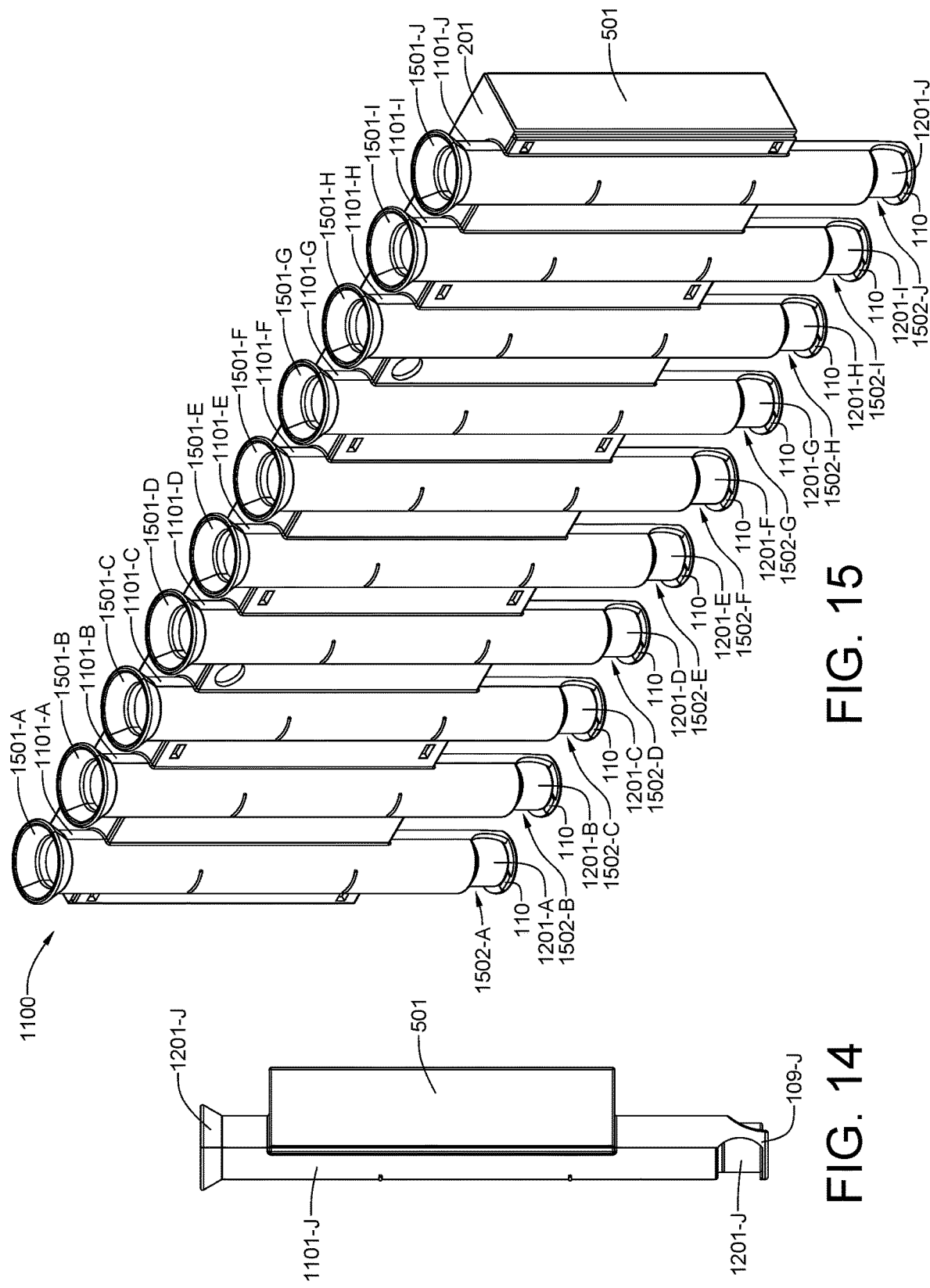

HOLDER/DISPENSER FOR MULTIPLE STACKS OF IDENTICALLY-COLORED ZIRCONIA INGOTS

FIELD OF THE INVENTION

The present invention relates, generally, to holders and dispensers and, more particularly, to a wall-mounted holder/dispenser for multiple stacks of identically-colored zirconia ingots.

BACKGROUND OF THE INVENTION

A crown is a type of dental restoration which completely caps or encircles a tooth or dental implant. Crowns are often needed when a large cavity threatens the ongoing health of a tooth. They are typically bonded to the tooth using a dental cement. Crowns can be made from many materials, which are usually fabricated using indirect methods. Crowns are often used to improve the strength or appearance of teeth. While unarguably beneficial to dental health, the procedure and materials can be relatively expensive.

The most common method of crowning a tooth involves using a dental impression of a prepared tooth by a dentist to fabricate the crown outside of the mouth. The crown can then be inserted at a subsequent dental appointment. Using this indirect method of tooth restoration allows use of strong restorative materials requiring time-consuming fabrication methods requiring intense heat, such as casting metal or firing porcelain which would not be possible to complete inside the mouth. Because of the expansion properties, the relatively similar material costs, and the cosmetic benefit, many patients choose to have their crown fabricated from gold.

As new technology and materials science have evolved, computers are increasingly becoming a part of crown fabrication, such as in CAD/CAM dentistry.

Crowns can also be installed on an implant. A dental implant (also known as an endosseous implant or fixture) is a surgical component that interfaces with the bone of the jaw or skull to support a dental prosthesis such as a crown, bridge, denture, facial prosthesis or to act as an orthodontic anchor. The basis for modern dental implants is a biologic process called osseointegration, in which materials such as titanium form an intimate bond to bone. The implant fixture is first placed so that it is likely to osseointegrate, then a dental prosthetic is added. A variable amount of healing time is required for osseointegration before either the dental prosthetic (a tooth, bridge or denture) is attached to the implant or an abutment is placed which will hold a dental prosthetic.

For individual tooth replacement, an implant abutment is first secured to the implant with an abutment screw. A crown (the dental prosthesis) is then connected to the abutment with dental cement, a small screw, or fused with the abutment as one piece during fabrication. Dental implants, in the same way, can also be used to retain a multiple tooth dental prosthesis either in the form of a fixed bridge or removable dentures.

An implant supported bridge (or fixed denture) is a group of teeth secured to dental implants so the prosthetic cannot be removed by the user. Bridges typically connect to more than one implant and may also connect to teeth as anchor points. Typically the number of teeth will outnumber the anchor points with the teeth that are directly over the implants referred to as abutments and those between abutments referred to as pontics. Implant supported bridges attach to implant abutments in the same way as a single tooth implant replacement. A fixed bridge may replace as few as two teeth (also known as a fixed partial denture) and may extend to replace an entire arch of teeth (also known as a fixed full denture). In both cases, the prosthesis is said to be fixed because it cannot be removed by the denture wearer.

Yttria-stabilized zirconia, also known simply as zirconia is a very hard ceramic that is used as a strong base material in some full ceramic restorations. Zirconia is relatively new in dentistry and the published clinical data is correspondingly limited. The zirconia used in dentistry is zirconium oxide which has been stabilized with the addition of yttrium oxide. Yttria-stabilized zirconia is also known as YSZ.

The zirconia substructure (core) is usually designed on a digital representation of the patient's mouth, which is captured with a 3D digital scan of the patient, impression, or model. The core is then milled from a block of zirconia in a soft pre-sintered state. Once milled, the zirconia is sintered in a furnace where it shrinks by twenty percent and reaches its full strength of 850 MPa (MegaPascals) to 1000 MPa.

The zirconia core structure can be layered with tooth tissue-like feldspathic porcelain to create the final color and shape of the tooth. Because bond strength of layered porcelain fused to zirconia is not strong, "monolithic" zirconia crowns are often made entirely of the zirconia ceramic with no tooth tissue-like porcelain layered on top. Zirconia is the hardest known ceramic in industry and the strongest material used in dentistry. Monolithic zirconia crowns tend to be highly opaque in appearance, while lacking translucency and fluorescence. For the sake of appearance, many dentists will not use monolithic crowns on anterior (front) teeth.

To a large extent, materials selection in dentistry determine the strength and appearance of a crown. Some monolithic zirconia materials produce the strongest crowns in dentistry (the registered strength for some zirconia crown materials is near 1000 MPa.), but these crowns are not usually considered to be natural enough for teeth in the front of the mouth; though not as strong, some of the newer zirconia materials are of better appearance, but they are still not generally as aesthetically acceptable as porcelain fused crowns. When porcelain is fused to the zirconia core, these crowns are more natural than the monolithic zirconia crowns but they are not strong. By contrast, when porcelain is fused to glass infiltrated alumina, crowns are very natural-looking and very strong, though not as strong as monolithic zirconia crowns. Another monolithic material, lithium-disilicate, produces extremely translucent leucite-reinforced crowns that often appear to be too gray in the mouth, and to overcome this, the light shade polyvalent colorants are added, which take on a distinctly unnatural, bright white appearance. Other crown material properties to be considered are thermal conductivity and radiolucency. Stability/looseness of fit on the prepared tooth and cement gap at the margin are sometimes related to materials selection, though these crown properties are also commonly related to system and fabricating procedures.

Given that each patient recipient of a crown has teeth that are uniquely colored from a lifetime of stains, a zirconia ingot of the proper color must be matched to the patient's remaining teeth. As a general rule, materials used to create crowns are available in ten different shades. This is also true of the puck-shaped zirconia ingots from which the crowns are milled. They are typically provided in packages, which do not lend themselves to ease of access. What is needed for dental laboratories is a wall-mounted holder/dispenser for zirconia ingots which provides ready access to each of the ten color shades of ingots.

SUMMARY OF THE INVENTION

The present invention provides a wall-mountable holder/dispenser for ten different shades of puck-shaped ingots from which dental crowns are fabricated. The holder/dispenser is formed from two snap-together pieces: an anterior portion and a posterior portion. Ten cylindrical columns are formed when the anterior and posterior portions are snapped together, with each portion forming one-half of each column. The posterior portion also includes a bottom extension for each column. Each extension underlies a column and provides a front opening through which an individual ingot can be extracted from the column with the fingers. Each extension has an upward protruding bump at the anterior end thereof which acts as a stop to prevent ingots from slipping out of the opening. Each column of the holder/dispenser is designed to hold a stack of identically colored zirconia ingots.

BRIEF DESCRIPTION OF THE DRAWINGS

The ingot holder/dispenser is bilaterally symmetrical. Thus, the right end thereof is a mirror image of the left end.

FIG. 2 is a top plan view of the posterior portion of the ingot holder/dispenser;

FIG. 3 is a bottom plan view of the posterior portion of the ingot holder/dispenser;

FIG. 4 is a left end elevational view of the posterior portion of the ingot holder/dispenser;

FIG. 5 is an isometric view of the posterior portion of the ingot holder/dispenser from a top-right-front vantage point;

FIG. 14 is a right end elevational view of the fully-assembled ingot holder/dispenser;

FIG. 15 is an isometric view of the fully-assembled ingot holder/dispenser from a top-right-front vantage point;

DESCRIPTION OF THE PREFERRED EMBODIMENT

Figure 1:
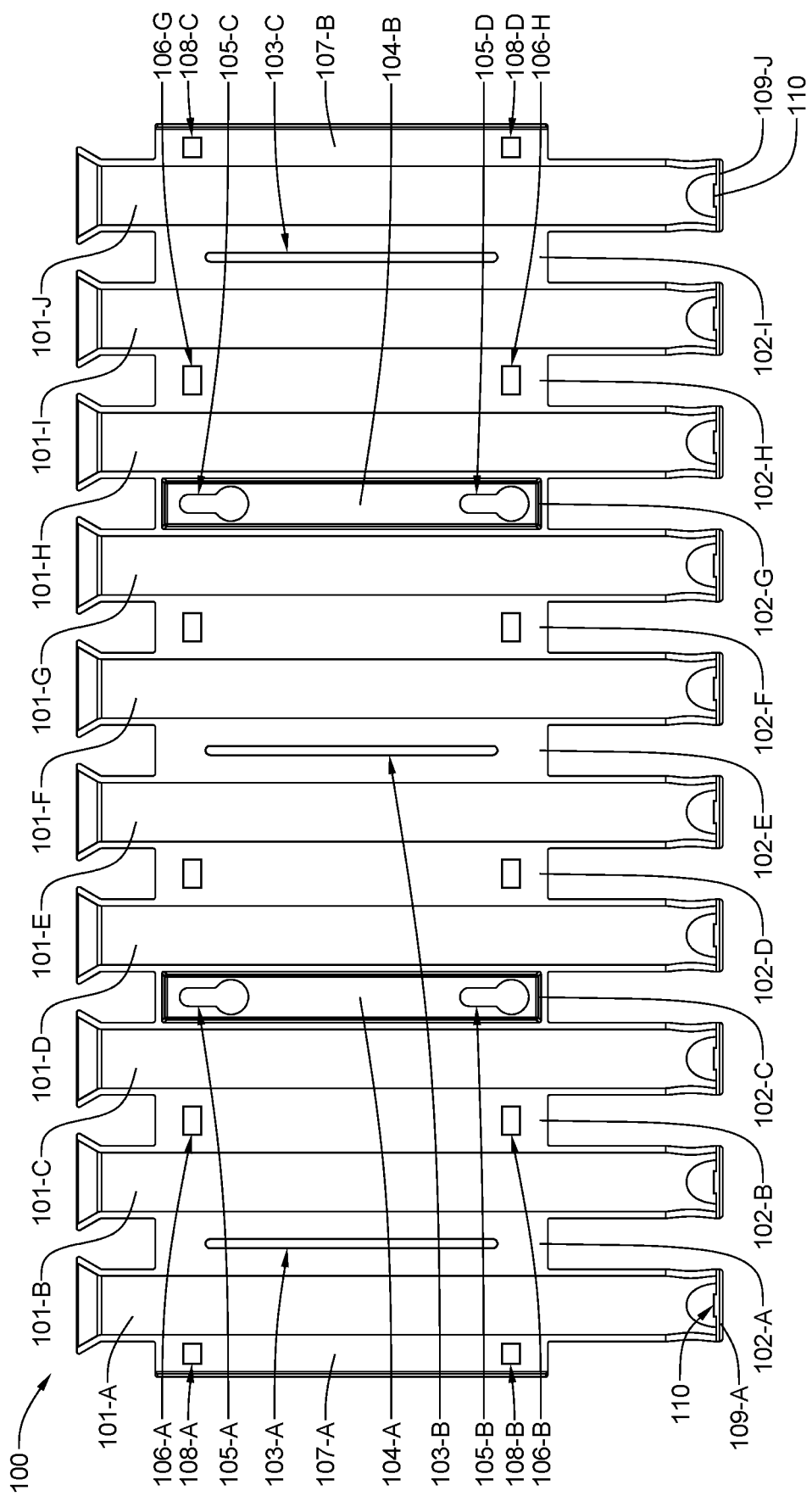
FIG. 1 is a front elevational view of the rear portion of the ingot holder/dispenser.
Figure 6:
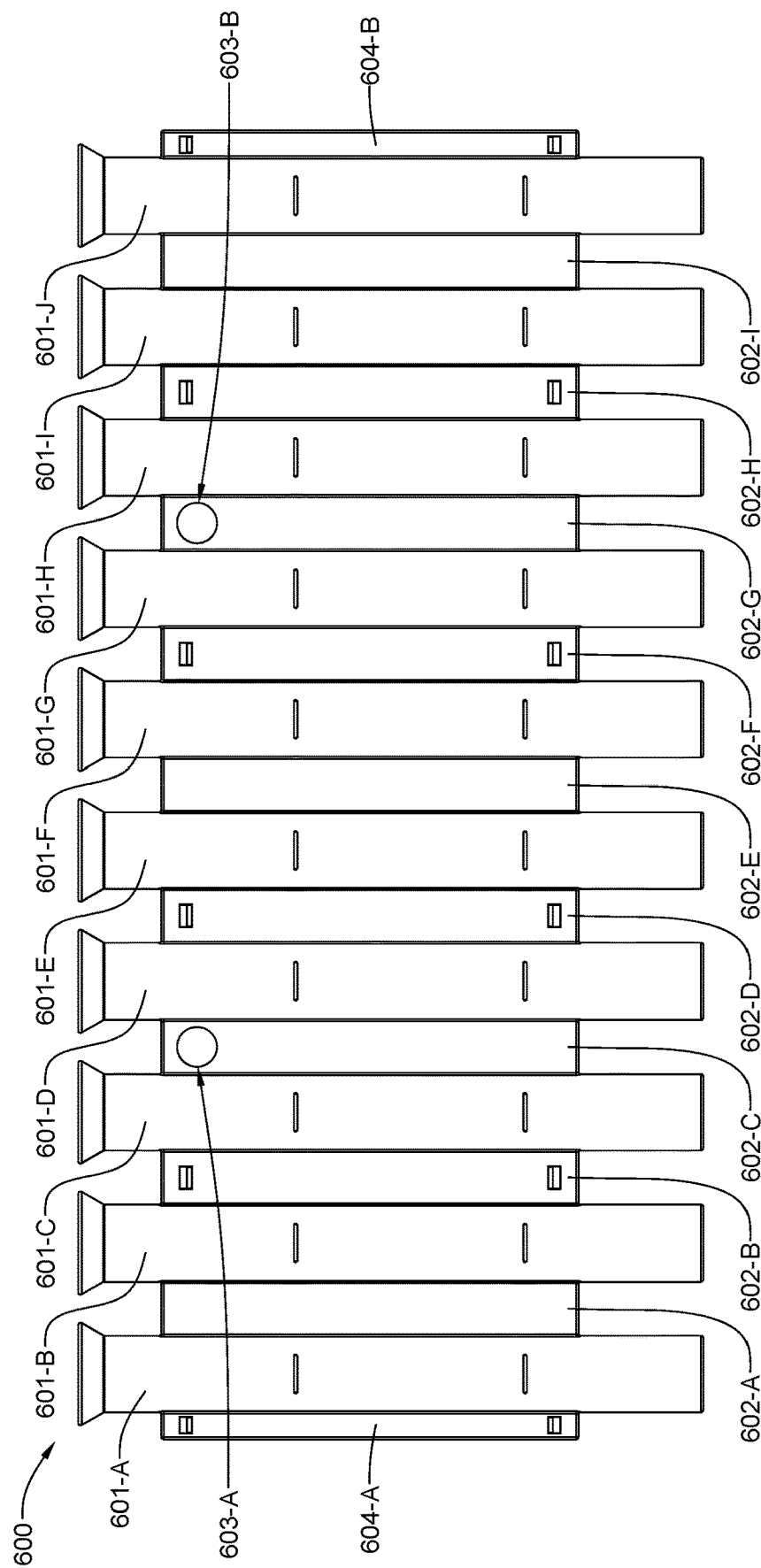
FIG. 6 is a front elevational view of the anterior portion of the ingot holder/dispenser.

The invention will now be described in detail, with reference to the attached drawing figures. Element numbers comprise three digits. The left-most digit indicates the drawing figure number where the element is first clearly visible.

Referring now to FIGS. 1 through 5, the rear portion 100 of the ingot holder/dispenser provides ten rear half columns 101-A, 101-B, 101-C, 101-D, 101-E, 101-F, 101-G, 101-H, 101-I and 101-J which are interconnected by rectangular rear connector panels 102-A, 102-B, 102-C, 102-D, 102-E, 102-F, 102-G, 102-H and 102-I. Rear connector panels 102-A, 102-E and 102-I have central alignment slots 103-A, 103-B and 103-C, respectively, which receive one of three alignment fins, which project from and are unitary with the anterior portion 600. Rear connector panels 102-C is and 102-G are equipped with extension recesses 104-A and 104-B. Extension recess 104-A contains two mounting screw apertures 105-A, 105-B, while extension recess 10-4B contains two mounting screw apertures 105-C and 105-D. Rear connector panels 102-B, 102-D, 102-F and 102-H each contain a pair of rectangular clip retainer apertures, which receive retainer clips which project from and are unitary with the anterior portion 601. Clip retainer apertures 106-A and 106-B are associated with rear connector panel 102-B; 106-C and 106-D are associated with rear connector panel 102-D; 106-E and 106-F are associated with rear connector panel 102-F; and 106-G and 106-H are associated with rear connector panel 102-H. Each of rectangular rear end panels 107-A and 107-B, which are unitary with half column 101-A and 101-J, respectively, are also equipped with a pair of rectangular clip retainer apertures. Clip retainer apertures 108-A and 108-B are associated with end panel 107-A, while clip retainer apertures 108-C and 108-D are associated with end panel 107-B. Each half column incorporates a bottom extension. Bottom extension 109-A is associated with half column 101-A; bottom extension 109-B is associated with half column 101-B; and so forth. It will be noted that each bottom extension 109 incorporates an upward protruding bump 110 that maintains the bottom most ingot in column alignment, until it is removed by the fingers of a dental laboratory technician. In FIG. 2, an upper panel 201, that intersects and is unitary with end panels 107-A and 107-B and rear connector panels 102-A, 102-B, 102-C, 102-D, 102-E, 102-F, 102-G, 102-H and 102-I, is visible. In FIG. 3, a lower panel 301, that intersects and is unitary with end panels 107-A and 107-B and rear connector panels 102-A, 102-B, 102-C, 102-D, 102-E, 102-F, 102-G, 102-H and 102-I, is visible. In FIG. 4, a left side panel 401, that intersects rear end panel 107-A, upper panel 201 and lower panel 301, is visible. In FIG. 5, right side panel 501, that intersects rear end panel 107-B, upper panel 201 and lower panel 301, is visible.

Figure 7:
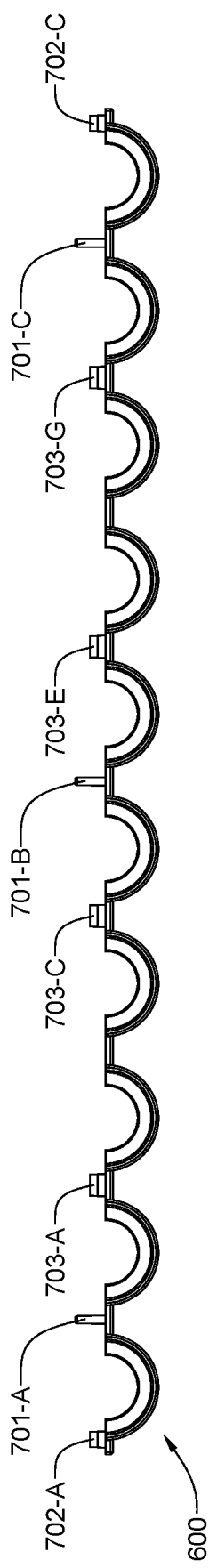
FIG. 7 is a top plan view of the anterior portion of the ingot holder/dispenser.
Figure 8:
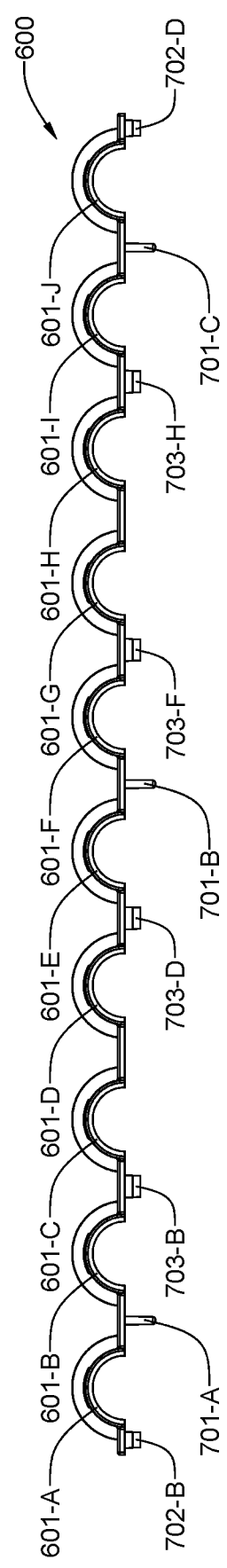
FIG. 8 is a bottom plan view of the anterior portion of the ingot holder/dispenser.
Figure 10:
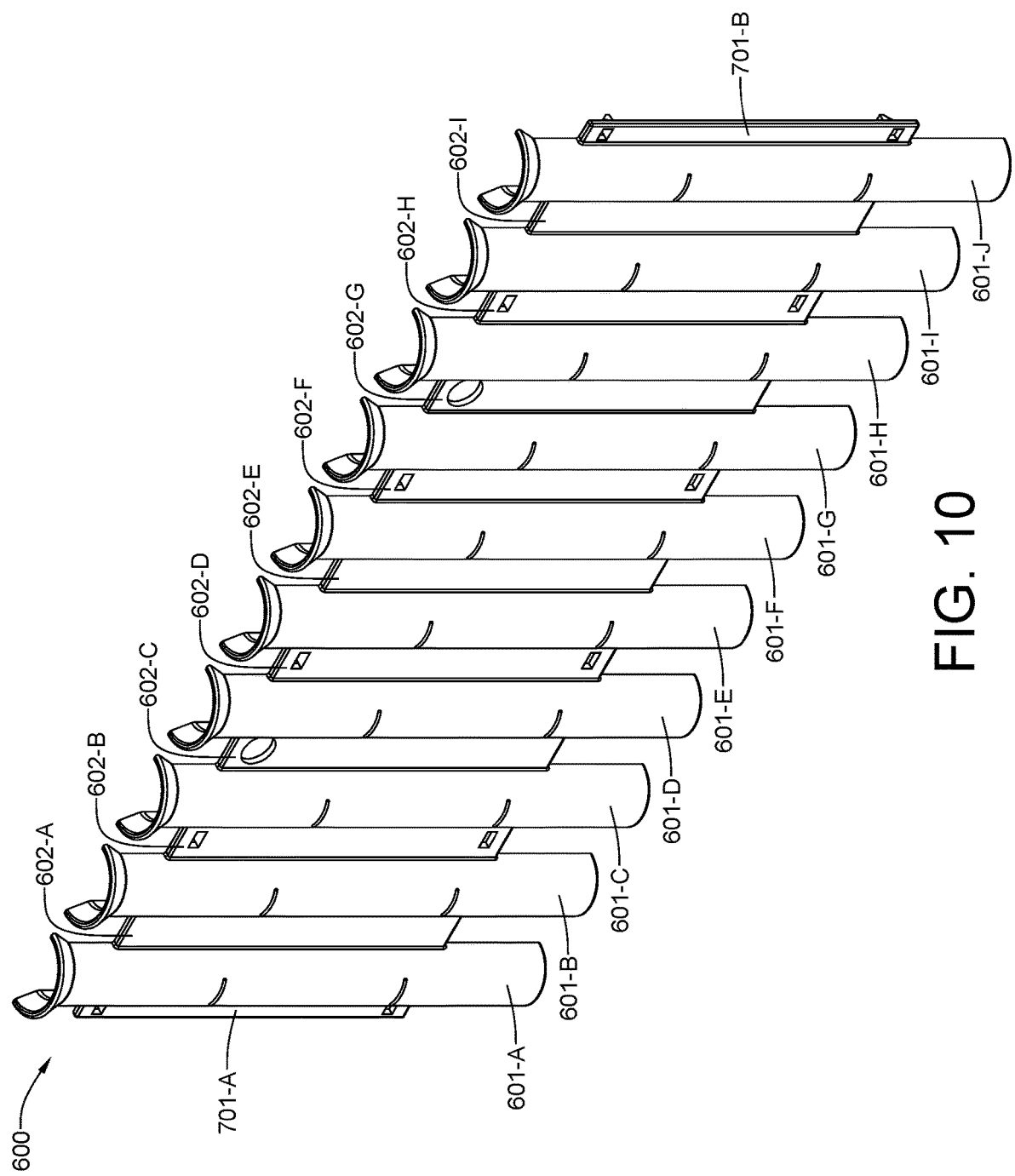
FIG. 10 is an isometric view of the anterior portion of the ingot holder/dispenser from a top-right-front vantage point.
Figure 9:
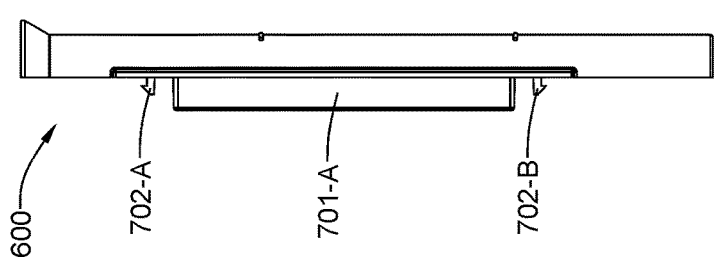
FIG. 9 is a left end elevational view of the anterior portion of the ingot holder/dispenser.
Figure 11:
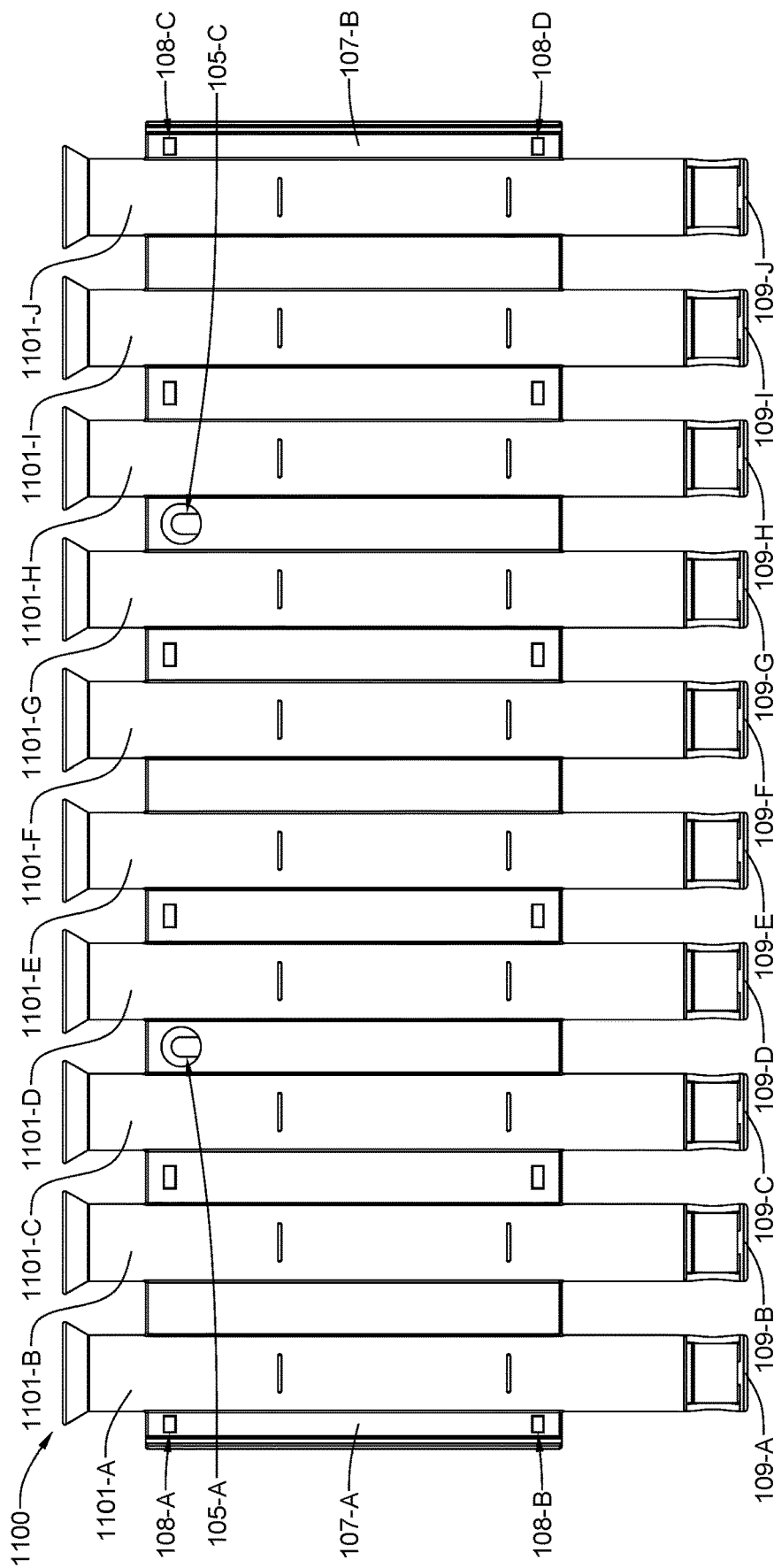
FIG. 11 is a front elevational view of the fully-assembled ingot holder/dispenser.
Figure 12:
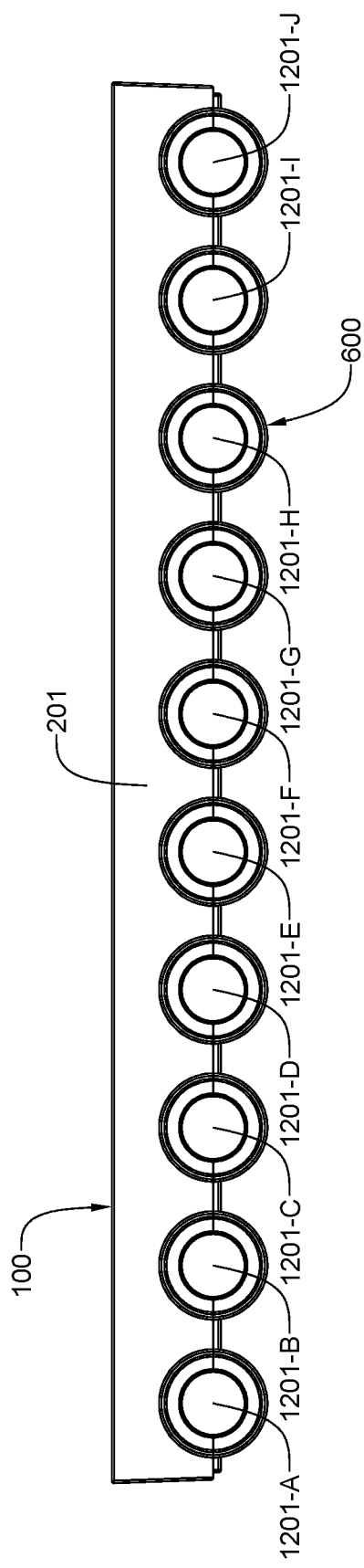
FIG. 12 is a top plan view of the fully-assembled ingot holder/dispenser.
Figure 13:
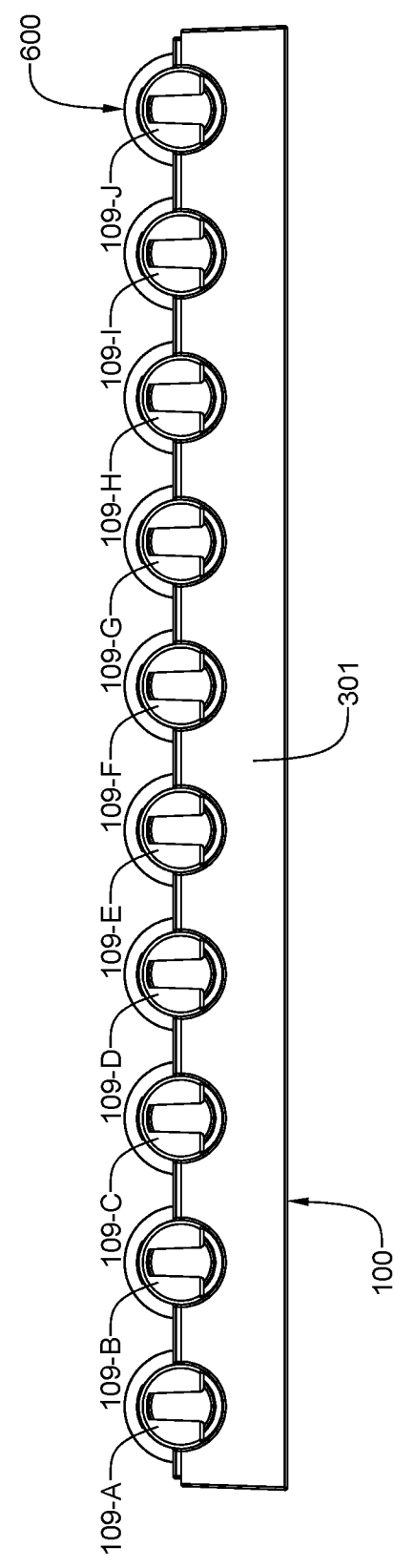
FIG. 13 is a bottom plan view of the fully-assembled ingot holder/dispenser.

Referring now to FIGS. 6 through 10, the anterior portion 600 of the ingot holder/dispenser provides ten front half columns 601-A, 601-B, 601-C, 601-D, 601-E, 601-F, 601-G, 601-H, 601-I and 601-J which are interconnected by rectangular front connector panels 602-A, 602-B, 602-C, 602-D, 602-E, 602-F 602-G 602-H and 602-I. The apertures 603-A and 603-B in front connector panels 602-C and 602-G, respectively, enable the two uppermost mounting screws to be tightened, thereby securing the ingot holder/dispenser to a vertical surface. Front end panels 604-A and 604-B are unitary with front half columns 601-A and 601-J, respectively. In FIG. 9, the leftmost alignment fin 901-A can be seen, as can be the two, leftmost retainer clips 902-A and 902-B, which engage clip retainer apertures 108-A and 108-B, respectively. In FIG. 7, retainer clips 702-A, 703-A, 703-C, 703-E, 703-G and 702-C are visible, as are alignment fins 701-A, 701-B and 701-C. In FIG. 8, retainer clips 702-B, 703-B, 703-D, 703-F, 703-H and 702-D are visible, as are alignment fins 701-A, 701-B and 701-C.

Referring now to FIGS. 11 through 17, the anterior portion 600 and the posterior portions of the ingot holder/dispenser have been pressed together, mating in a common plane, with the clips 702-A, 702-B, 702-C, 702-D, 703-A, 703-B, 703-C, 703-D, 703-E, 703-F, 703-G and 703-H engaging clip retainer apertures 108-A, 108-B, 108-C, 108-D, 106-A, 106-B, 106-C, 106-D, 106-E, 106-F, 106-G and 106-H, respectively, resulting in a fully-assembled ingot holder/dispenser 1100 having ten fully-formed columns 1101-A, 1101-B, 1101-C, 1101-D, 1101-E, 1101-F, 1101-G, 1101-H, 1101-I and 1101-J, and into which (see FIG. 12) zirconia ingots 1201-A, 1201-B, 1201-C, 1201-D, 1201-E, 1201-F, 1201-G, 1201-H, 1201-I and 1201-J have been loaded, respectively. In FIG. 15, it will be noted that every full column 1101-A, 1101-B, 1101-C, 1101-D, 1101-E, 1101-F, 1101-G, 1101-H, 1101-I and 1101-J is topped by a funnel 1501-A, 1501-B, 1501-C, 1501-D, 1501-E, 1501-F, 1501-G, 1501-H, 1501-I and 1501-J, respectively, that facilitates the loading of each column 1101 with zirconia ingots 1201. In FIGS. 12, 15, 16 and 17, it will be noted that each column has been at least partially filled with zirconia ingots 1201. A single ingot 1201-A, 1201-B, 1201-C, 1201-D, 1201-E, 1201-F, 1201-G, 1201-H, 1201-I and 1201-J is visible in the opening 1502-A, 1502-B, 1502-C, 1502-D, 1502-E, 1502-F, 1502-G, 1502-H, 1502-I and 1502-J, respectively, of each column above its respective bottom extension 109. It will be noted that the upward protruding bump 110 on each bottom extension 109 prevents the exposed zirconia ingot from sliding out of the opening. A dental lab technician can remove any of the ten exposed ingots 1503 by lifting it over the upward protruding bump 110 and sliding it outwardly away from the opening 1502.

Figure 16:
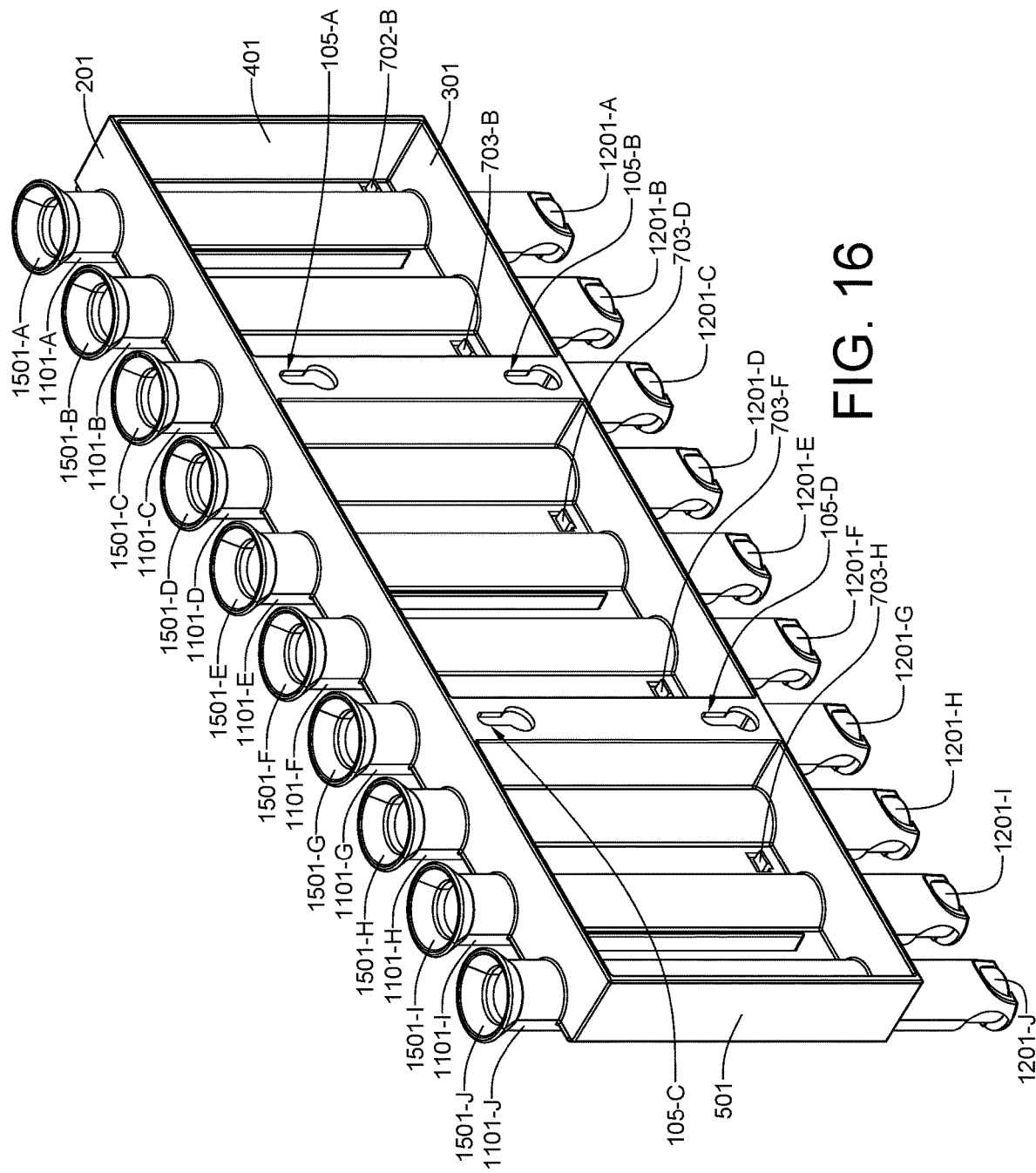
FIG. 16 is an isometric view of the fully-assembled ingot holder/dispenser from a top-right-rear vantage point.
Figure 17:
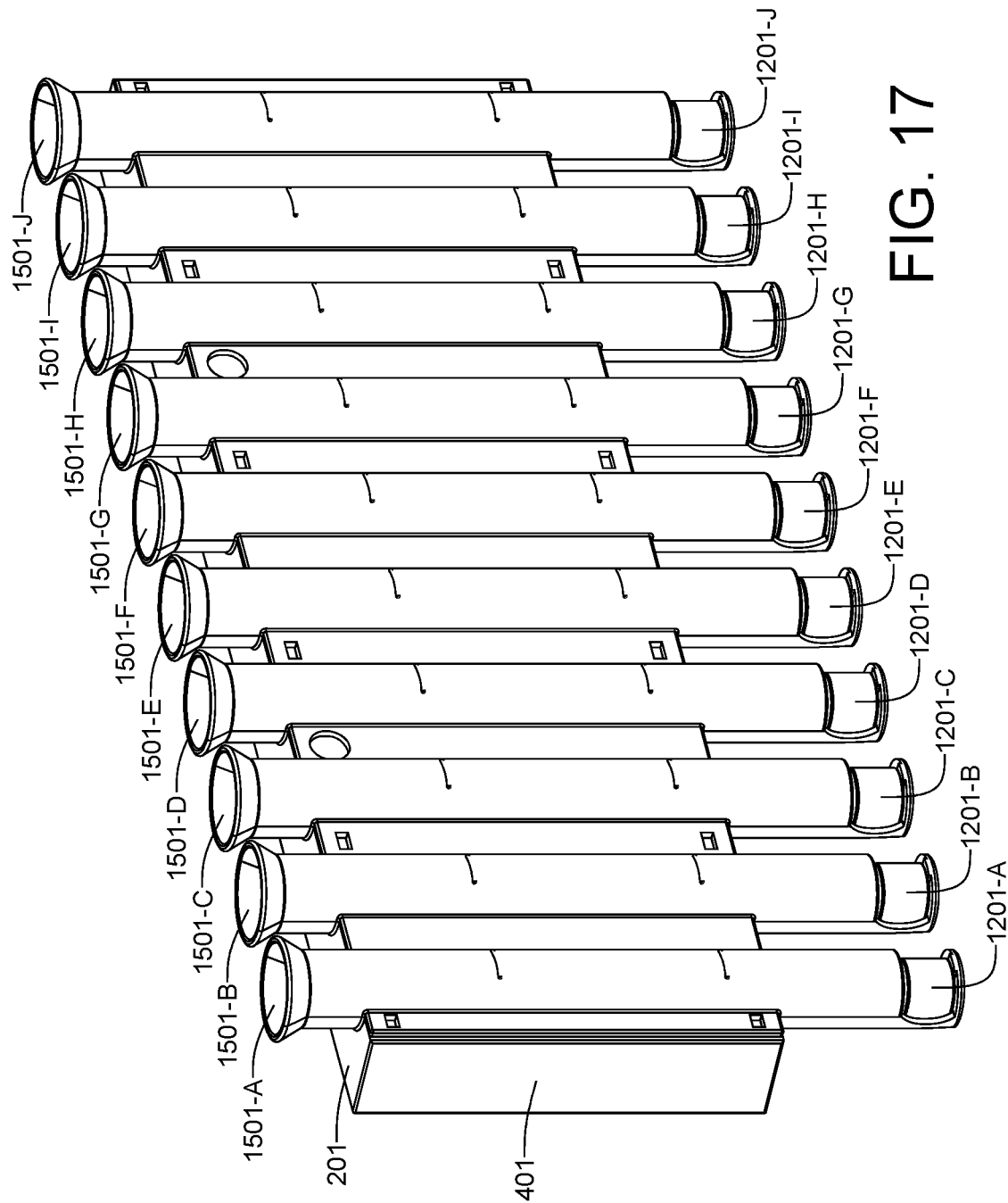
FIG. 17 is an alternative isometric view of the fully-assembled ingot holder/dispenser from a top-left-front vantage point.

Referring now, specifically, to FIG. 16, it will be noted that the retainer clips on the anterior portion 600 have snapped over their respective clip retainer apertures 106 and 108. In this view, only clip retainers 702-B, 703-B, 703-D, 703-F and 703-H are visible.

Both the posterior portion 100 and the anterior portion 600 are most suitably manufactured with injection molding using a thermoplastic resin such as polycarbonate (PC), polyvinylchloride (PVC), acrylonitrile butadiene styrene (ABS), polystyrene (PS) or polypropylene (PP).

Although only a single embodiment of the ingot holder/dispenser has been shown and described, it will be obvious to those having ordinary skill in the art that changes and modifications may be made thereto without departing from the scope and the spirit of the invention as hereinafter claimed.

What is claimed is:

1. A wall-mountable holder/dispenser for multiple stacks of puck-shaped ingots from which dental crowns are fabricated, said holder/dispenser comprising:
    an anterior portion; and
    a posterior portion;
    wherein both portions snap together to form multiple columns in which the multiple stacks of ingots can be stored, with each portion providing one half of each column; and
    wherein the posterior portion also includes multiple bottom extensions, with each extension underlying a column and providing support for a single stack of ingots when the anterior and posterior portions are snapped together, and
    wherein a gap is provided between each bottom extension and a bottom edge of the anterior portion, thereby providing a front opening for each column, through which a technician can extract an individual ingot from a bottom of a stack using his fingers.

2. The wall-mountable holder/dispenser of claim 1, wherein each bottom extension has an upward protruding bump at the anterior end thereof which acts as a stop over which a bottommost ingot of a stack must be slid in order to remove it from the front opening.

3. The wall-mountable holder/dispenser of claim 1, wherein each portion includes at least ten half columns, which, when the anterior and posterior portions are snapped together, provide storage columns for a color gradient of ingot stacks, with each stack consisting of identically colored zirconia ingots.

4. The wall-mountable holder/dispenser of claim 1, wherein the posterior portion incorporates a plurality of apertures, through which fasteners used to secure the holder/dispenser to a vertical surface may be inserted.

5. The wall-mountable holder/dispenser of claim 1, wherein the posterior and the anterior portions snap together using a plurality of interlocking clips and clip retaining apertures.

6. The wall-mountable holder/dispenser of claim 1, wherein the posterior and anterior portions each have a connector panel between each adjacent pair of half columns, and said connector panels enable adjacent pairs of columns to be spaced apart from one another when the posterior and anterior portions are snapped together.

7. The wall-mountable holder/dispenser of claim 1, wherein each portion is injection molded from a thermoplastic resin.

8. The wall-mountable holder/dispenser of claim 7, wherein the thermoplastic resin is selected from the group consisting of polycarbonate, polyvinylchloride, acrylonitrile butadiene styrene, polystyrene and polypropylene.

9. A wall-mountable holder/dispenser for multiple stacks of puck-shaped ingots from which dental crowns are fabricated, said holder/dispenser comprising:
    an anterior portion; and
    a posterior portion mateable with the anterior portion within a common plane to form multiple columns in which the multiple stacks of ingots can be stored, with each portion providing one half of each column;
    wherein the posterior portion also includes multiple bottom extensions, with each extension underlying a column and providing support for a single stack of ingots when the anterior and posterior portions are joined together, and
    wherein a gap is provided between each bottom extension and a bottom edge of the anterior portion, thereby providing a front opening for each column, through which a technician can extract an individual ingot from a bottom of a stack using his fingers.

10. The wall-mountable holder/dispenser of claim 9, wherein both portions interlock together.

11. The wall-mountable holder/dispenser of claim 9, wherein each bottom extension has an upward protruding bump at the anterior end thereof which acts as a stop over which a bottommost ingot of a stack must be slid in order to remove it from the front opening.

12. The wall-mountable holder/dispenser of claim 9, wherein each portion includes at least ten half columns, which, when the anterior and posterior portions are snapped together, provide storage columns for a color gradient of ingot stacks, with each stack consisting of identically colored zirconia ingots.

13. The wall-mountable holder/dispenser of claim 9, wherein the posterior portion incorporates a plurality of apertures, through which fasteners used to secure the holder/dispenser to a vertical surface may be inserted.

14. The wall-mountable holder/dispenser of claim 9, wherein the posterior and the anterior portions snap together using a plurality of interlocking clips and clip retaining apertures.

15. The wall-mountable holder/dispenser of claim 9, wherein the posterior and anterior portions each have a connector panel between each adjacent pair of half columns, and said connector panels enable adjacent pairs of columns to be spaced apart from one another when the posterior and anterior portions are snapped together.

16. The wall-mountable holder/dispenser of claim 9, wherein each portion is injection molded from a thermoplastic resin.

17. The wall-mountable holder/dispenser of claim 16, wherein the thermoplastic resin is selected from the group consisting of polycarbonate, polyvinylchloride, acrylonitrile butadiene styrene, polystyrene and polypropylene.

18. A wall-mountable holder/dispenser for multiple stacks of puck-shaped ingots from which dental crowns are fabricated, said holder/dispenser comprising:
   an anterior portion; and
   a posterior portion mateable with the anterior portion within a common plane to form multiple, spaced-apart columns in which the multiple stacks of ingots can be stored, with each portion providing one half of each column;
   wherein the posterior portion also includes multiple bottom extensions, with each extension underlying a column and providing support for a single stack of ingots when the anterior and posterior portions are joined together, and
   wherein a gap is provided between each bottom extension and a bottom edge of the anterior portion, thereby providing a front opening for each column, through which a technician can extract an individual ingot from a bottom of a stack using his fingers.

19. The wall-mountable holder/dispenser of claim 18, wherein both portions interlock together to provide at least ten storage columns for a color gradient of ingot stacks, with each stack consisting of identically colored zirconia ingots.

20. The wall-mountable holder/dispenser of claim 18, wherein each bottom extension has an upward protruding bump at the anterior end thereof which acts as a stop over which a bottommost ingot of a stack must be slid in order to remove it from the front opening.

* * * * *